Jan. 24, 1961 H. H. VANDERZEE ET AL 2,969,240
PHONOGRAPH ANNUNCIATOR-PLAYMETER
Filed May 6, 1957 6 Sheets-Sheet 3

INVENTORS.
H. H. Vanderzee and
George S. Brown, Jr.
By L. F. Harmand
Atty.

United States Patent Office 2,969,240
Patented Jan. 24, 1961

2,969,240

PHONOGRAPH ANNUNCIATOR-PLAYMETER

Harry Herbert Vanderzee, Bangor, Wis., and George S. Brown, Jr., Grand Rapids, Mich., assignors, by mesne assignments, to Automatic Music, Inc., Grand Rapids, Mich., a corporation of Delaware Filed May 6, 1957, Ser. No. 657,220

12 Claims. (Cl. 274—10)

This invention relates to automatic phonographs and particularly to a combined annunciator and playmeter suitable for use in connection with automatic coin controlled phonographs or juke boxes.

It has heretofore been common practice to provide automatic coin controlled phonographs with some type of annunciator whereby the mechanism displays a visual indication identifying each selection as it is being played, so that users of the machine who might wish to repeat the selection can properly identify it by title, as well as learn the code numbers by which it may be selected. It has also been common practice to provide machines of this type with devices termed "playmeters" or "popularity meters" which serve to record the number of times each individual record in the magazine of the machine is played. This gives the operator of the machine exact information as to which of the available selections are in greatest demand, and thus permits him to replace unwanted records with more popular ones, and to thereby adjust the repertoire of selections available in any given machine to the tastes of the people using the machine at that specific location.

It is the primary object of the present invention to provide a unique and improved mechanism for accomplishing the essential functions of both the playmeter and annunciator in a single relatively compact mechanism, adapted for use in connection with almost any conventional record player, but particularly suited to use in connection with automatic machines of very large record capacity, wherein up to a hundred records (200 selections) are arranged in radial positions in a rotary magazine.

It is a further object of the present invention to provide a combined annunciator-playmeter wherein much of the power transmission mechanism, gearing and other operating parts heretofore required for separate annunciator and playmeter units are combined into a single assembly so that the total number of moving parts is considerably less than in devices having separate annunciator and playmeter devices.

An important object of the present invention is to provide a playmeter having a single dial, irrespective of the number of records available in the machine, with separate indicators all movable across the single dial to show the relative popularity readings of each record. A still further object of the invention is to provide an improved annunciator-playmeter wherein the identity of the record being played at any given time and the indication of its relative popularity are each given simultaneously on a single pair of matched dials movable together and viewed through a single window. The accomplishment of these objects affords a sharp contrast to conventional devices of prior art in which a separate dial is often required for indication of the popularity of each record.

In a machine of one hundred record capacity this feature eliminates the need of a very large number of separately calibrated dials, reduces costs, and simplifies the assembly considerably.

A still further object of the invention is to provide a playmeter for an automatic phonograph wherein information as to the relative popularity of the several different records carried in the magazine are combined into a visual representation resembling a bar-graph, so that the relative popularity of the records involved can be determined at a glance, without need for the operator to read figures nor make numerical comparisons. A related object is to provide an improved popularity meter comprising a mechanical bar-graph, wherein the mechanism is designed to facilitate quick, easy and convenient resetting of the markers corresponding to the individual records.

A still further object of the invention is to provide an annunciator capable of showing which side of the record is being played, as well as identifying the record itself, yet suited to automatic phonographs having uni-directional motion between the record magazine and the record playing devices.

A still further object of the invention is to provide a popularity meter wherein the parts of the mechanism associated with the individual records is reduced to a minimum. In the present invention there is only one part specifically associated with each of the individual records carried in the magazine. This makes for simplification and cost reduction, and greatly reduces the number of parts ordinarily required in machines of the prior art.

The foregoing objects are accomplished in the present invention by an improved and simplified mechanism wherein the functions of both the annunciator and playmeter are accomplished by a single drum-like wheel, geared to the movable magazine of the record changer and provided with means for indicating the code letters of each individual record as the playing takes place, as well as showing a cumulative evaluation of the relative popularity of the many records in the machine.

In the form of the invention illustrated in the attached drawings, the annunciator-playmeter mechanism is shown in association with a phonographic record changer having a turntable in a fixed location with a rotary magazine movable with respect to the turntable, although it will be understood that the invention is equally applicable to phonographic record changers of other designs. In the drawings.

Figure 1:
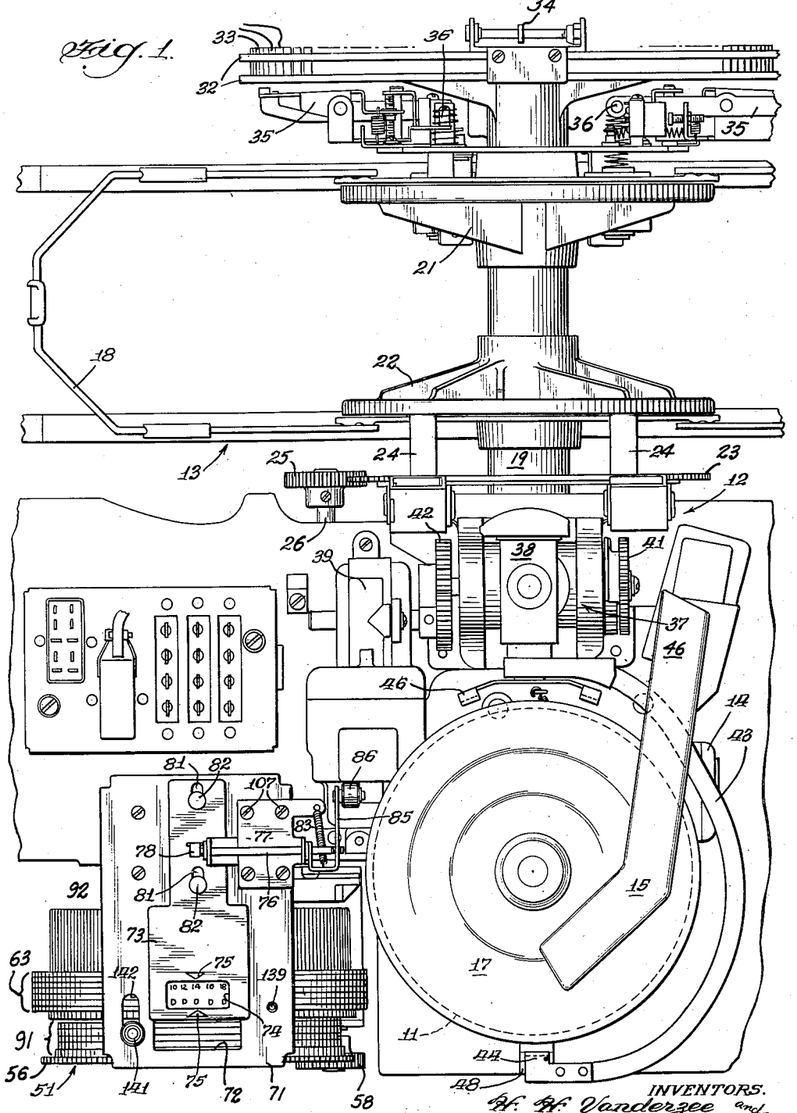
Figure 1 is a plan view of a preferred form of phonographic record changer employing the present invention.

While the annunciator-playmeter unit described herein is applicable to phonographic record changers of various designs, it finds its greatest field of usefulness in connection with record changers of capacity in the range of two hundred selections, where annunciator-playmeters of the type conventionally employed in the past require so many parts and are so complex as to be impractical and overly expensive. The mechanism disclosed herein is also particularly well adapted to employment in connection with a record changer, such as illustrated in Figure 1, wherein a rotary turntable 11 is mounted in fixed relationship with respect to a record transfer mechanism generally indicated at 12 to carry records to and from a magazine 13. As illustrated, an electric motor 14 is provided to rotate the turntable and a tone arm 15 is pivoted on an appropriate mounting 16, so that its stylus can engage the upper face of the record 17 in the conventional manner.

Figure 2:
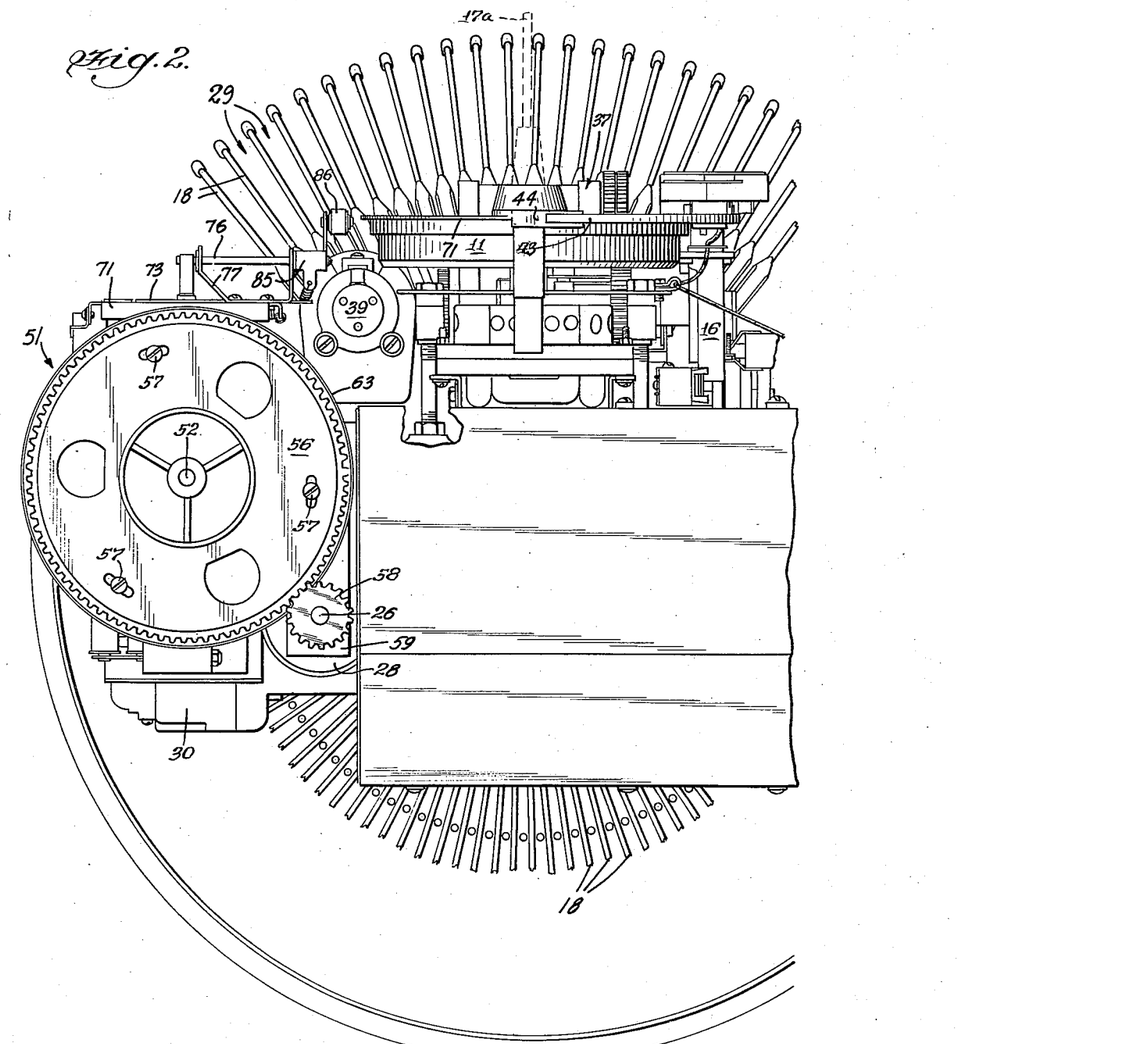
Figure 2 is a front elevational view of the mechanism illustrated in Figure 1.

The record magazine consists of a rotary wheel made up of a multiplicity of inverted U-shaped wire bails 18, each extending between oppositely disposed paired hub plates 21 and 22 mounted on a horizontal tubular shaft 19. The entire magazine is mounted for relative rotation on the axis of the shaft 19 and is provided with a ring gear 23 carried on extension posts 24 and meshed with a pinion 25, driven by the shaft 26 of a speed reducer 27 forming an integral part of the traverse motor 28 (Figure 2).

While the mechanism has been illustrated with records removed from the magazine to give a better showing of the operating parts it will be understood that the spaced wire bails 18 provide a multiplicity of record compartments in the form of slots 29 between the individual wires so that a record, such as the record 17 shown on the turntable, may be lifted from its position in the magazine by the record transfer mechanism 12 and placed on the turntable for playing. Similarly, the record may be returned to the dotted line position 17a of the magazine when the play has been concluded. In this connection it will be understood, of course, that the present invention presupposes the existence of appropriate record selection, transfer and control devices which may be in the form of the selector wheel 32 having multiple stop pins 33 around its periphery, with means such as a finger 34 arranged to selectively "set" any one of the pins 33 and with appropriate scanning devices 35 and reset mechanism 36 to cause the machine to play the selected records. It is also contemplated that this transfer mechanism 12 may include a fixed pedestal 37 disposed between the turntable and the magazine with a rotatable transfer head 38 driven by a driving motor 39 through appropriate gearing 41 and 42. The transfer head 38 carries a semi-circular record transfer arm 43, preferably provided with an outer gripper block 44 and with paired inner gripper members 46 co-acting therewith to engage the outer edges of the record during the transfer movement, but since the details of structure of the record player, magazine, selector and transfer mechanism are well known and do not form an essential part of the present invention, it is deemed unnecessary to describe these devices further in the present disclosure. Suffice to say that the swinging arm 43 moves between a vertical position (in which it encircles the record 17a at the top center of the magazine) and either one of two horizontal positions (in which it partially encircles the turntable 11). It follows that in placing the record on the turntable the arm 43 may assume the position illustrated in Figures 1 and 2, wherein it lies in a position of rest under the tone arm 15, or it may lie on the other side of the turntable when the other side of the record is being played.

The annunicator-playmeter assembly consists of a rotatable drum generally designated 51 and mounted for rotation on a central shaft 52 fitted within appropriate bearings 53 in supporting casting 54 mounted on the main frame 55. The drum 51 carries a flat ring gear 56 secured to its front face by screws 57. The ring gear is driven by a pinion 58 carried on the forward end of the speed reducer shaft 26 heretofore described, so that the entire annunciator-playmeter assembly incorporated in the drum 51 rotates in unison with the record magazine 13. As shown, the shaft 26 is supported by an outboard bearing 59 on a bracket arm 61 secured to the frame 55 by appropriate screws 62.

The drum 51 is of composite construction, having an annunciator dial 63 of ring-like formation mounted on the outer peripheral edges of a pair of sheet metal rings 64 and 65, the assembly being held together by cap screws 66. The outer cylindrical surface of the dial ring 63 carries lettering identifying the records contained in the magazine of the machine. As shown, this lettering consists of a row 67 of "even" numerals 2 to 20 inclusive along one edge, with a row 68 of "odd" numerals 1 to 19 inclusive along the other edge of the dial. Between the numerals, there is a row 69 of ten code letters (A, B, C, D, E, F, G, H, J and K) each repeated twenty times.

Thus, with the specific arrangement shown, the combination of ten code letters and twenty code numerals permits the identification of two hundred selections, and codes the front and back faces of the one hundred records available in the compartments 29 of the record magazine.

The code indicia 67, 68 and 69 appearing on the outer dial surface of the ring 63 is partially covered by a top plate 71 having a viewing window 72 over which a shiftable indicator slide 73 is mounted. The indicator slide has an aperture 74 provided with a pair of aligned marker arrows 75 and of height sufficient to permit viewing of two rows of letters only. Thus, when the drum is in any given position (for example, with the indicia 14–C–13 at the top), the indicator slide 73 may be shifted back or forth into either of the positions illustrated in Figures 3 or 4. The machine will indicate selection C–13 with the setting of Figure 3 or 14–C with the setting of Figure 4. It follows that by control of the indicator slide 73 the machine will give two readings for each record and to thus identify either the front face or the back face selection thereof.

It will be apparent that with the drum 51 and dial 63 geared to rotate synchronously with the rotation of the magazine, the indicia on the dial may be quite easily arranged so that one set of the figures (for example, 14–C–13) come into alignment between the arrows 75 when the corresponding record reaches the vertical position 17a of the magazine. This indicates which record is being played. To indicate which side of the record is being played, however, it is necessary that the apparatus shift the indicator slide 73 during the playing of one side of the record, but leave it unchanged for the playing of the other side. This is accomplished in the present invention by a rock shaft 76 mounted on a bracket 77 affixed to the upper surface of the top plate 71 and having a spring arm 78 extending through a perforation 79 in the indicator slide plate 73, so that the slide plate may be shifted back and forth (to the extent permitted by slots 81 around the mounting screws 82) to accomplish the change of position illustrated in Figures 3 and 4 respectively. A spring 83 is arranged to normally hold the indicator dial in the "even" number position of Figure 4 but the rock shaft 76 has an arm 85 carrying a roller 86 disposed in a position to be engaged by the semi-circular record transfer arm 43 whenever the arm is lowered on the left hand side of the turntable, as viewed in Figures 1 and 2. Thus, if the record lifted from the magazine is turned in one direction as it moves to the turntable, the letters and figures visible through the indicator window will show an even number, while if the record is played other side up by swinging the transfer arm in the opposite direction, the odd numeral will be visible.

From the foregoing it will be apparent that the position of the wheel 51 with respect to the arrows 75 in the viewing window 74 will indicate which record is being played at the moment, while the position of the indicator dial 73, controlled, of course, by the position of the record transfer arm, will modify the foregoing indication of the record to indicate which side thereof is being played.

The drum 51 includes a playmeter dial portion 91 immediately forward of the ring 65 and adjoining the forward edge of the dial 63. This dial need not have letters or figures thereon unless desired, but it is preferably provided with parallel markers in the form of bars or lines 10, 20, 30, 40, 50, etc. indicating the number of times any one of the records in the magazine has been played since the last resetting. The drum is provided with a multiplicity of marker bars 92, which may be slender, headed pins spaced about the periphery of the drum 51 in a manner corresponding to the spacing of the record slots 29 in the magazine. Each pin 92 is disposed immediately below one set of the coded record identification markings on the dial 63. Thus for a one hundred record machine there would be one hundred equally spaced pins, each extending through registering apertures in the rings 64 and 65. The plastic dial 63 has an inwardly extending conical flange 94 arranged to bear lightly against the outer surface of each of the pins and hold them with a sufficient frictional drag to prevent accidental shifting of the pins, yet permit them to slide longitudinally without undue resistance.

At the beginning of operation of the machine, the pins are all set with their heads flush against the forward surface of the ring 65. This is the zero position indicating the beginning of play. The device is provided with an automatic bar-advancing mechanism, generally indicated at 101, to move each pin ahead as its corresponding record is played. With the preferred arrangement illustrated each pin or bar is moved ahead only a small, almost microscopic increment of movement, such that the head 94 of each pin will be moved to the marker 10 only when ten plays have been completed, and will subsequently be advanced across the marks 20—30—40, etc. as the individual record is played a corresponding number of times.

Figure 3:
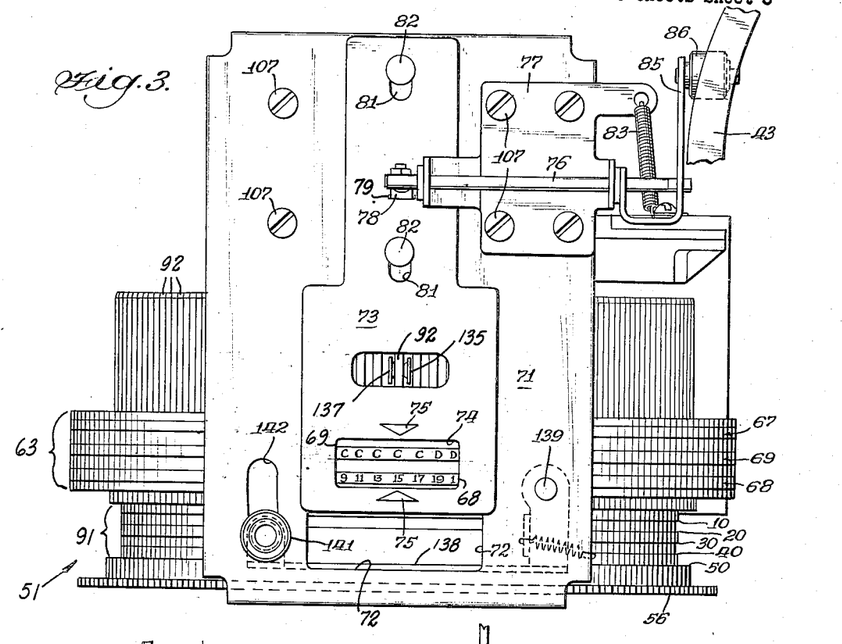
Figure 3 is an enlarged plan view of the annunciator-playmeter unit, showing the dial and indicators.
Figure 4:
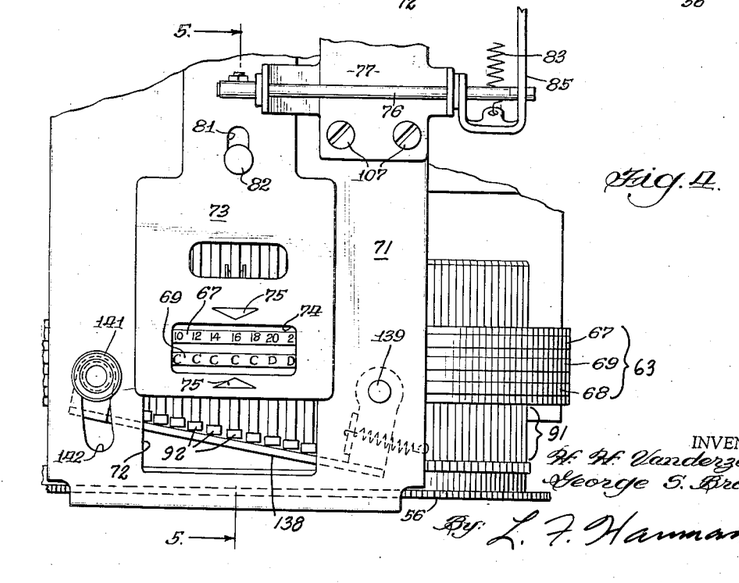
Figure 4 is a fragmentary view similar to Figure 3, showing the indicator slide thereof in changed position.
Figure 6:
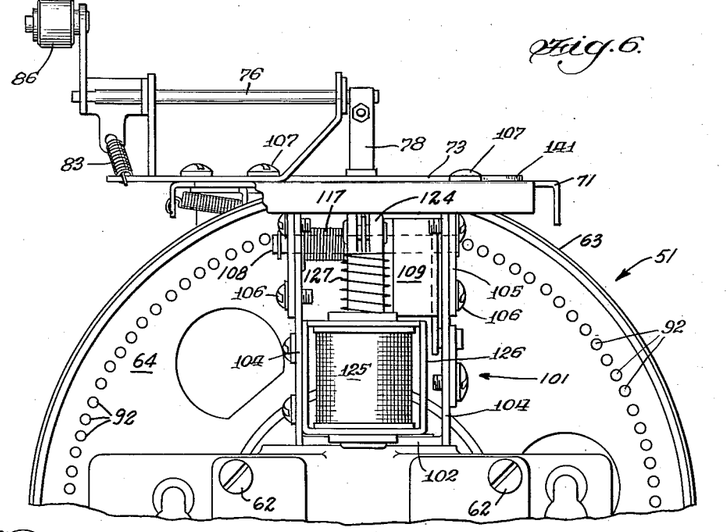
Figure 6 is a fragmental rear elevational view of the annunciator-playmeter drum and its associated mechanism, the view being taken substantially on the plane of the line 6—6 of Figure 5.
Figure 7:
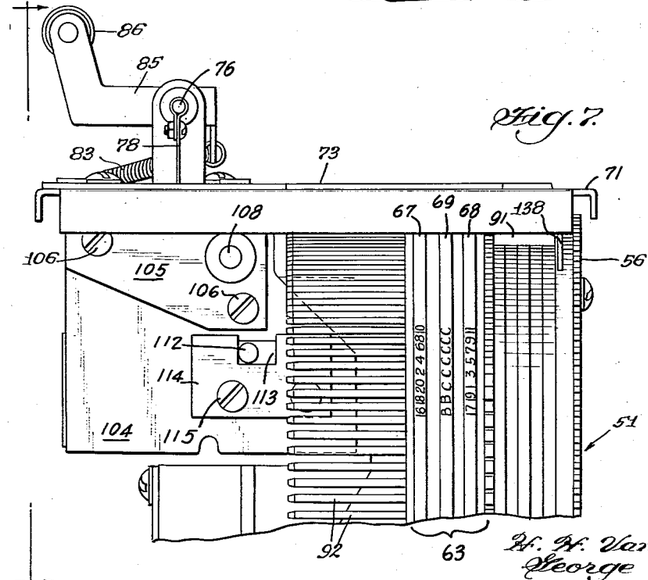
Figure 7 is a fragmentary side elevational view of the mechanism of Figure 6.
Figure 11:
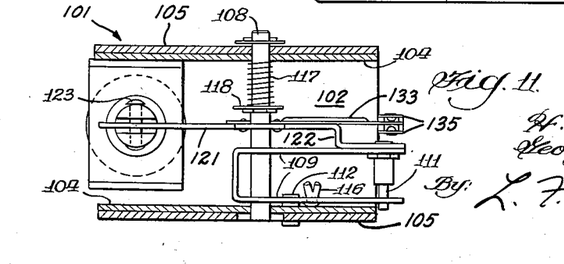
Figure 11 is a plan view of the electro-mechanical bar-advancing mechanism employed herein, the view being taken substantially on the plane of the line 11—11 of Figures 5 and 8.

The bar-advancing mechanism 101 is mounted within a U-shaped sub-frame having a bottom portion 102 secured to the bearing casting 54 by screws 103. The sub-frame has paired side plates 104 (Figure 6) extended upwardly and carrying paired angle brackets 105 secured by screws 106. The top plate 71 is mounted on outwardly extending flanges on these brackets 105 by screws 107 (Figure 3). A cross pin or rock-shaft 108 extends between suitable aligned apertures in the side plates 104. This rock shaft 108 carries an outwardly extending double-armed shiftable pivot bracket 109 having a pivot pin 111 at its outermost end. The bracket 109 also has a limit pin 112 extending through a limiting aperture 113 in the side plate 104 with an adjustable limit stop plate 114 affixed to the outer face of plate 104 by cap screws 115 to permit adjustment of the rocking movement of the bracket 109. The bracket 109 also carries a non-metallic friction button 116 slidably bearing against the inside face of the side wall 104 and held in light frictional contact therewith by a coiled compression spring 117 encircling the rock-shaft 108 and confined between the inner wall 104 of the bracket and a locking ring 118 fixedly mounted on the rock-shaft (Figure 11).

The pivot pin 111 at the end of shiftable pivot bracket 109 carries a reversely extending rocker arm 121 offset at 122 and extending to a coupling pin 123 in the armature 124 of an electrical solenoid 125 carried in a frame 126 between the side plates 104. A light coil spring 127 encircles the armature 124 of the solenoid, tending to lift the armature and the end of the rocker arm.

The rocker arm 121 has a lost motion aperture 131 through which the rock shaft 108 passes. The arm 121 also has a central tab depending therefrom, with a yieldable spring blade 133 secured by rivets 134 and extending forwardly, with a pair of spring jaws 135 mounted on rivets 136 and extending upwardly in closely spaced parallel relation with their upper ends having opposed convex gripper buttons 137 normally lying immediately below one of the pins 92 of the playmeter.

A cam plate 138 is pivoted to the top plate 71 at 139 and provided with a manually operable control button 141 shiftable within the slot 142 in top plate. Thus, by shifting the button 141 to the rearmost end of the slot the cam 138 will assume an angular position across the front of the pins 92, so that one cycle of rotation of the drum 51 will return all pins to "zero" position. In operation, the drum 51 rotates in timed relation with the magazine 13 so that whenever any record in the magazine is brought to the top center position 17a, its corresponding slide pin or indicator bar 92 is brought to top center position on the drum, with the letters and numerals identifying the given record in direct alignment between the marker arrows 75 on the indicator slide 73. In the event that the record is placed on the turntable by swinging the transfer arm 43 to the side of the turntable under the tone arm, the indicator slide 73 will remain in retracted position due to the influence of the spring 83, and the aperture 74 in the indicator slide will display an "even" code number such as the indication 14–C of Figure 14. If the record is placed on the turntable other side up, however, the transfer arm 43 will lie on the side of the turntable near the annunciator assembly, and will engage the roller 86 on the trigger 85, rocking the shaft 76 and shifting the indicator slide 73 forwardly to display and "odd" numeral, such as the indication C–13 of Figure 3.

Figure 5:
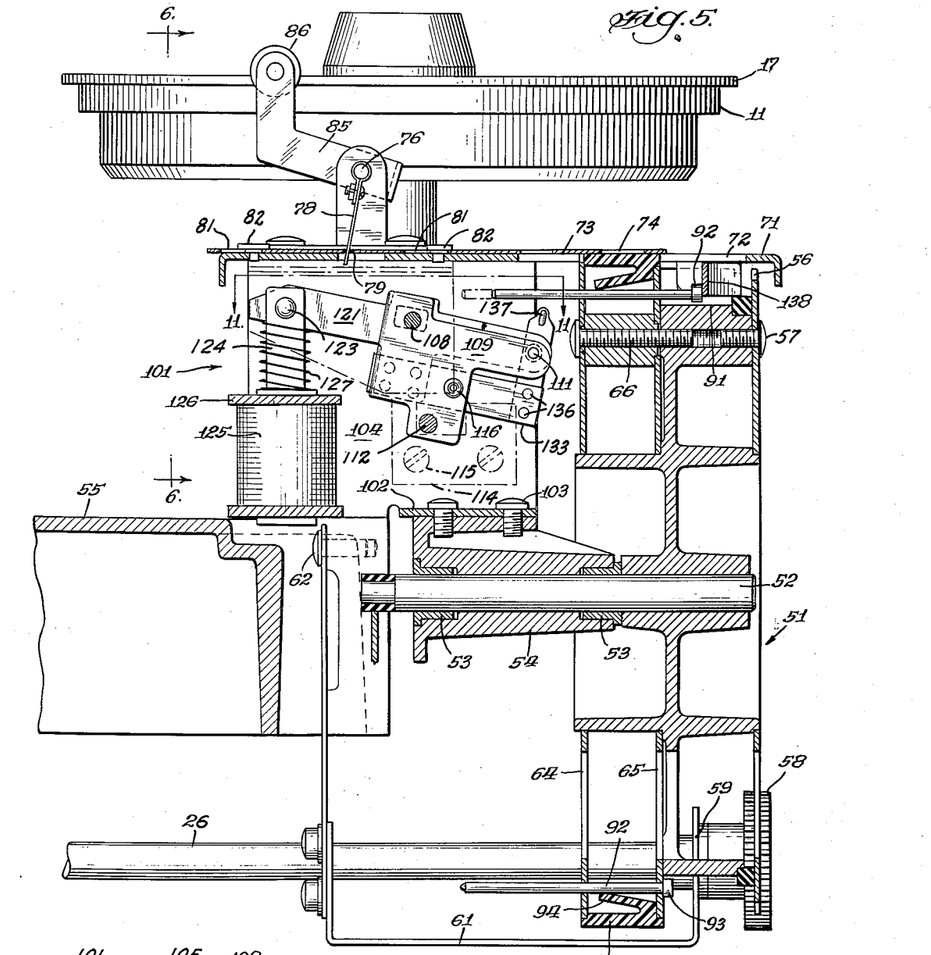
Figure 5 is a central detail sectional view through the principal working parts of the annunciator-playmeter mechanism.
Figure 8:
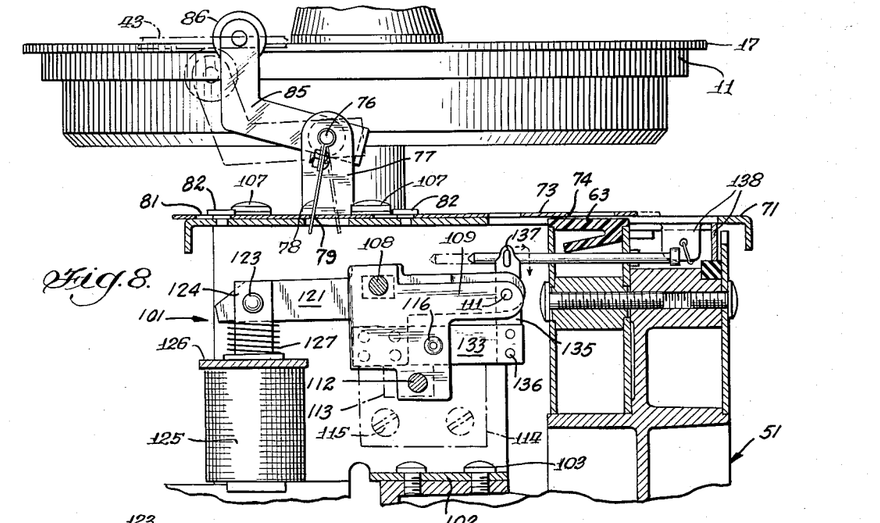
Figure 8 is a fragmental sectional view similar to Figure 5 but showing the parts thereof in changed position.
Figure 9:
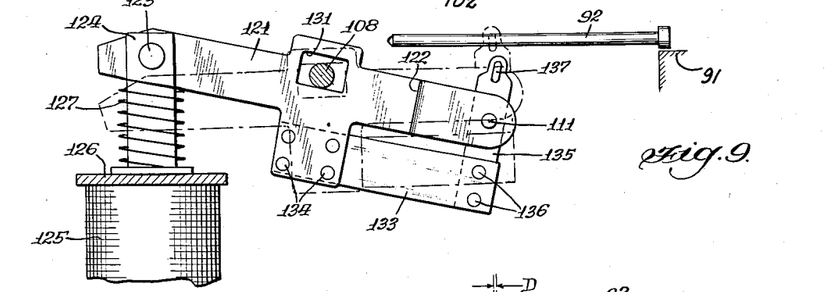
Figure 9 is a diagrammatic illustration of an electro-mechanical bar-advancing mechanism employed in the practice of the present invention.
Figure 10:
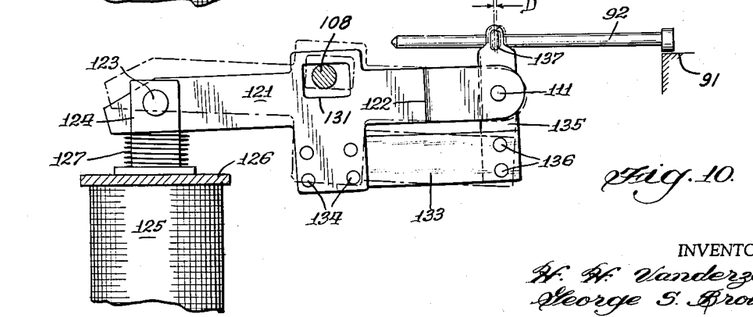
Figure 10 is a diagrammatic view similar to Figure 9, showing the parts in changed position.

In either event, the actuation of the selector, control and transfer mechanisms operating to place the record on the turntable also causes momentary actuation of the winding of solenoid 125 (Figure 8) and operates the bar-advancing mechanism 101 of the playmeter. When the solenoid 125 is energized, the downward movement of its armature acts through the rock-shaft 121 to lift the pivot pin 111 and raise the free end of the pivot bracket 109 from its normal position of Figure 5 to its position of maximum height, as shown in Figures 8 and 10. It will be understood that during this operation the movement of the bracket 109 is limited by engagement of the limit pin 112 in the limit aperture 113, and that when once moved to the position shown, the bracket 109 will be held against displacement by frictional engagement of the button 116 with the inside surface of one of the sides 104 of the sub-frame. The downward movement of the solenoid also advances the upper ends of the spring blades 135 toward one of the pins 92, so that the gripper buttons 137 on the upper ends of the blades frictionally engage it. When the solenoid 125 releases, upward movement of its armature first permits a slight pivotal motion about the pin 111 (in the amount permitted by the lost motion between the aperture 131 and the rock shaft 108) causing the friction buttons 137 to advance a small increment of motion indicated at D. This carries the pin 92 forwardly an amount representing the playing of one selection. Upon release of the solenoid, the pivot 111 moves downwardly, disengaging the blades from the pins and returning the parts to original position.

It will be apparent from the drawings that in the normal operation of the mechanism the pin advance devices are standing clear of the pins 92 so that these may move freely as the magazine rotates, but the mechanism is such that upon actuation of the solenoid 125, the upper ends 137 of the spring blades 135 move into alignment with one of the pins, engage it and move it forwardly a predetermined slight increment of motion, and then automatically disengage and return to their normal position.

Having thus described our invention, what we claim as new and desire to protect by United States Letters Patent is:

1. In an automatic phonograph mechanism including a record player consisting of a turntable and tone arm, a record magazine of circular form with multiple record compartments in radial arrangement; means for retaining a multiplicity of flat disc records in said magazine, and a record transfer mechanism including a semi-circular arm having opposed gripper members to move a record from vertical position in a compartment of said magazine to horizontal position on said turntable, an annunciator-playmeter assembly including an annunciator dial and a playmeter dial both carried by a drum located adjacent the turntable and operatively connected to the record magazine for synchronous rotation therewith; the annunciator dial having an index strip with at least two rows of indicia indicating the back and front faces respectively of the disc records in the magazine and an annunciator indicator consisting of a shiftable member movable between two alternative positions of registry with said rows of indicia; the playmeter dial including a series of parallel markings with a plurality of parallel indicator bars corresponding in number to the records in the magazine and each individually related to a specific record, said bars extending in a direction perpendicular to said markings and being longitudinally shiftable across said markings; with means responsive to the playing of either side of any record to advance one of said bars in successive small increments of longitudinal motion; said means including a single electro-mechanical advancing device common to all of said bars; said advancing device being normally out of engagement with all of said bars, with means responsive to the actuation of the record player to engage any one of said bars in accordance with the record selection made and to advance said bar a small increment of longitudinal movement upon each actuation of the record player.

2. In an automatic phonograph mechanism including a record player consisting of a turntable and tone arm, a record magazine of circular form with multiple record compartments in radial arrangement; means for retaining a multiplicity of flat disc records in said magazine, and a record transfer mechanism including a semi-circular arm having opposed gripper members to move a record from vertical position in a compartment of said magazine to horizontal position on said turntable an annunciator-playmeter assembly including an annunciator dial and a playmeter dial both carried by a drum located adjacent the turntable and operatively connected to the record magazine for synchronous rotation therewith; the annunciator dial having an index strip with at least two rows of indicia indicating the back and front faces respectively of the disc records in the magazine and an annuciator indicator consisting of a shiftable member movable between two alternative positions of registry with said rows of indicia; the playmeter dial including a series of parallel markings with a plurality of parallel indicator bars corresponding in number to the records in the magazine and each individually related to a specific record, said bars extending in a direction perpendicular to said markings, and being longitudinally shiftable across said markings; with means responsive to the playing of either side of any record to advance one of said bars in successive small increments of longitudinal motion.

3. In an automatic phonograph mechanism including a record player consisting of a turntable and tone arm, a record magazine of circular form with multiple record compartments in radial arrangement; means for retaining a multiplicity of flat disc records in said magazine, and a record transfer mechanism including a semi-circular arm having opposed gripper members to move a record from vertical position in a compartment of said magazine to horizontal position on said turntable, an annunciator-playmeter assembly including an annunciator dial and a playmeter dial both carried by a drum located adjacent the turntable and operatively connected to the record magazine for synchronous rotation therewith; an annunciator indicator consisting of a shiftable member movable between two alternative positions of registry; the playmeter dial including a plurality of parallel indicator bars corresponding in number to the records in the magazine and each individually related to a specific record, said bars being longitudinally shiftable; with means responsive to the playing of either side of any record to advance one of said bars in successive small increments of longitudinal motion; said means including a single electro-mechanical advancing device common to all of said bars; said advancing device being normally out of engagement with all of said bars, with means responsive to the actuation of the record player to engage any one of said bars in accordance with the record selection made and to advance said bar a small increment of longitudinal movement upon each actuation of the record player.

4. In an automatic phonograph mechanism including a record player consisting of a turntable and tone arm, a record magazine of circular form with multiple record compartments in radial arrangement; means for retaining a multiplicity of flat disc records in said magazine, and a record transfer mechanism including a semi-circular arm having opposed gripper members to move a record from vertical position in a compartment of said magazine to horizontal position on said turntable, an annunciator-playmeter assembly including an annunciator dial and a playmeter dial both carried by a drum located adjacent the turntable and operatively connected to the record magazine for synchronous rotation therewith; an annunciator indicator consisting of a shiftable member movable between two alternative positions of registry; the playmeter dial including a plurality of parallel indicator bars corresponding in number to the records in the magazine and each individually related to a specific record, said bars being longitudinally shiftable; with means responsive to the playing of either side of any record to advance one of said bars in successive small increments of longitudinal motion.

5. In an automatic phonograph mechanism including a record player consisting of a turntable and tone arm, a record magazine; with multiple record compartments; a record transfer mechanism to move a record from a compartment of said magazine to said turntable, an annunciator-playmeter assembly including an annunciator dial and a playmeter dial both carried by a drum located adjacent the turntable and operatively connected to the record magazine for synchronous rotation therewith, an annunciator indicator consisting of a shiftable member movable between two alternative positions of registry; the playmeter dial including a plurality of parallel indicator bars corresponding in number to the records in the magazine and each individually related to a specific record, said bars being longitudinally shiftable; with means responsive to the playing of either side of any record to advance one of said bars in successive small increments of longitudinal motion; said means including a single electro-mechanical advancing device common to all of said bars; said advancing device being normally out of engagement with all of said bars, with means responsive to the actuation of the record player to engage any one of said bars in accordance with the record selection made and to advance said bar a small increment of longitudinal movement upon each actuation of the record player.

6. In an automatic phonograph mechanism including a record player consisting of a turntable and tone arm, a record magazine; with multiple record compartments; a record transfer mechanism to move a record from a compartment of said magazine to said turntable; an annunciator-playmeter assembly including an annunciator dial and a playmeter dial both carried by a drum located adjacent the turntable and operatively connected to the record magazine for synchronous rotation ttherewith; an annunciator indicator consisting of a shiftable member movable between two alternative positions of registry; the playmeter dial including a plurality of parallel indicator bars corresponding in number to the records in the magazine and each individually related to a specific record, said bars being longitudinally shiftable; with means responsive to the playing of either side of any record to advance one of said bars in successive small increments of longitudinal motion.

7. In an automatic phonograph mechanism including a record player consisting of a turntable and tone arm, a record magazine of circular form consisting of a wheel of toroidal shape mounted for rotation on a horizontal axis with multiple open record slides in radial arrangement on said wheel; a record transfer mechanism consisting of means including a semi-circular arm having opposed gripper members to move a record from vertical position in a compartment at the top of said wheel and swing it to horizontal position on said turntable, an annunciator dial consisting of a drum located adjacent the turntable and operatively connected to the record magazine for synchronous rotation therewith, said dial having an index strip with at least two rows of indicia indicating the back and front faces respectively of each of the disc records in the magazine; an annunciator indicator consisting of a shiftable member movable between two alternative positions of registry with said rows of indicia, said indicator being spring urged into alignment with one of said sets of indicia and having mechanical means consisting of a trigger disposed adjacent the turntable at one side thereof and adapted to be engaged and actuated by the semi-circular record changer arm as it places a record on the turntable to shift it to a position of registry with another row of indicia.

8. In an automatic phonograph mechanism including a record player consisting of a turntable and tone arm, a record magazine of circular form consisting of a wheel of toroidal shape mounted for rotation on a horizontal axis with multiple open record slides in radial arrangement on said wheel; and a record transfer mechanism consisting of means including a semi-circular arm having opposed gripper members to move a record from vertical position in a compartment at the top of said wheel and swing it to horizontal position on said turntable, an annunciator dial consisting of a drum located adjacent the turntable and operatively connected to the record magazine for synchronous rotation therewith, said dial having an index strip with at least two rows of indicia indicating the back and front faces respectively of each of the disc records in the magazine; an annunciator indicator consisting of a shiftable member movable between two alternative positions of registry with said rows of indicia, said indicator being spring urged into alignment with one of said sets of indicia and having mechanical means to shift it to a position of registry with another row of indicia.

9. In an automatic phonograph mechanism including a record player, a record magazine of circular form consisting of a wheel of toroidal shape mounted for rotation on a horizontal axis with multiple open record slides in radial arrangement on said wheel; and a record transfer mechanism to move a record from said magazine to said turntable, a playmeter dial consisting of a rotatable drum operatively connected to the record magazine for synchronous rotation therewith; said dial including a series of parallel markings; with a plurality of parallel indicator bars mounted in said drum; said bars corresponding in number to the records in the magazine and each individually related to a specific record, extending in a direction perpendicular to said markings, and longitudinally shiftable across said markings; with means responsive to the playing of any record to advance the corresponding bar in successive small increments of longitudinal motion; said means including a single actuator common to all of said bars; said actuator being normally out of engagement with all of said bars, means responsive to the actuation of the record player to shift said actuator laterally to engage any one of said bars in accordance with the record selection made and means consisting of a shiftable cam to reset all of said indicator bars to a common starting position.

10. In an automatic phonograph mechanism including a record player, a record magazine of circular form consisting of a wheel of toroidal shape mounted for rotation on a horizontal axis with multiple open record slides in radial arrangement on said wheel, and a record transfer mechanism to move a record from said magazine to said turntable, a playmeter dial consisting of a rotatable drum operatively connected to the record magazine for synchronous rotation therewith; said dial including a series of parallel markings; with a plurality of parallel indicator bars mounted in said drum; said bars corresponding in number to the records in the magazine and each individually related to a specific record, extending in a direction perpendicular to said markings, and longitudinally shiftable across said markings; with means responsive to the playing of any record to advance the corresponding bar in successive small increments of longitudinal motion; said means including a single actuator common to all of said bars; said actuator being normally out of engagement with all of said bars, means responsive to the actuation of the record player to shift said actuator laterally to engage any one of said bars in accordance with the record selection made.

11. In an automatic phonograph mechanism including a record player, a record magazine of circular form consisting of a wheel of toroidal shape mounted for rotation on a horizontal axis with multiple open record slides in radial arrangement on said wheel; and a record transfer mechanism to move a record from said magazine to said turntable, a playmeter dial consisting of a rotatable drum operatively connected to the record magazine for synchronous rotation therewith; said dial including a series of parallel markings; with a plurality of parallel indicator bars mounted in said drum; said bars corresponding in number to the records in the magazine and each individually related to a specific record, extending in a direction perpendicular to said markings, and longitudinally shiftable across said markings; with means responsive to the playing of any record to advance the corresponding bar in successive small increments of longitudinal motion.

12. In an automatic phonograph mechanism including a record player, a record magazine; and a record transfer mechanism to move a record from said magazine to said player, a playmeter dial operatively connected to the record magazine for synchronous movement therewith; said dial including a series of parallel markings; with a plurality of parallel indicator bars; said bars corresponding in number to the records in the magazine and each individually related to a specific record, extending in a direction perpendicular to said markings, and longitudinally shiftable across said markings; with means responsive to the playing of any record to advance the corresponding bar in successive small increments of longitudinal motion.

References Cited in the file of this patent

UNITED STATES PATENTS

| | | |
|---|---|---|
| 2,318,526 | Rockola | May 4, 1943 |
| 2,360,847 | Burnham | Oct. 24, 1944 |
| 2,804,307 | Rockola | Aug. 27, 1957 |
| 2,810,582 | Kuntz | Oct. 22, 1957 |